Patented Jan. 29, 1924.

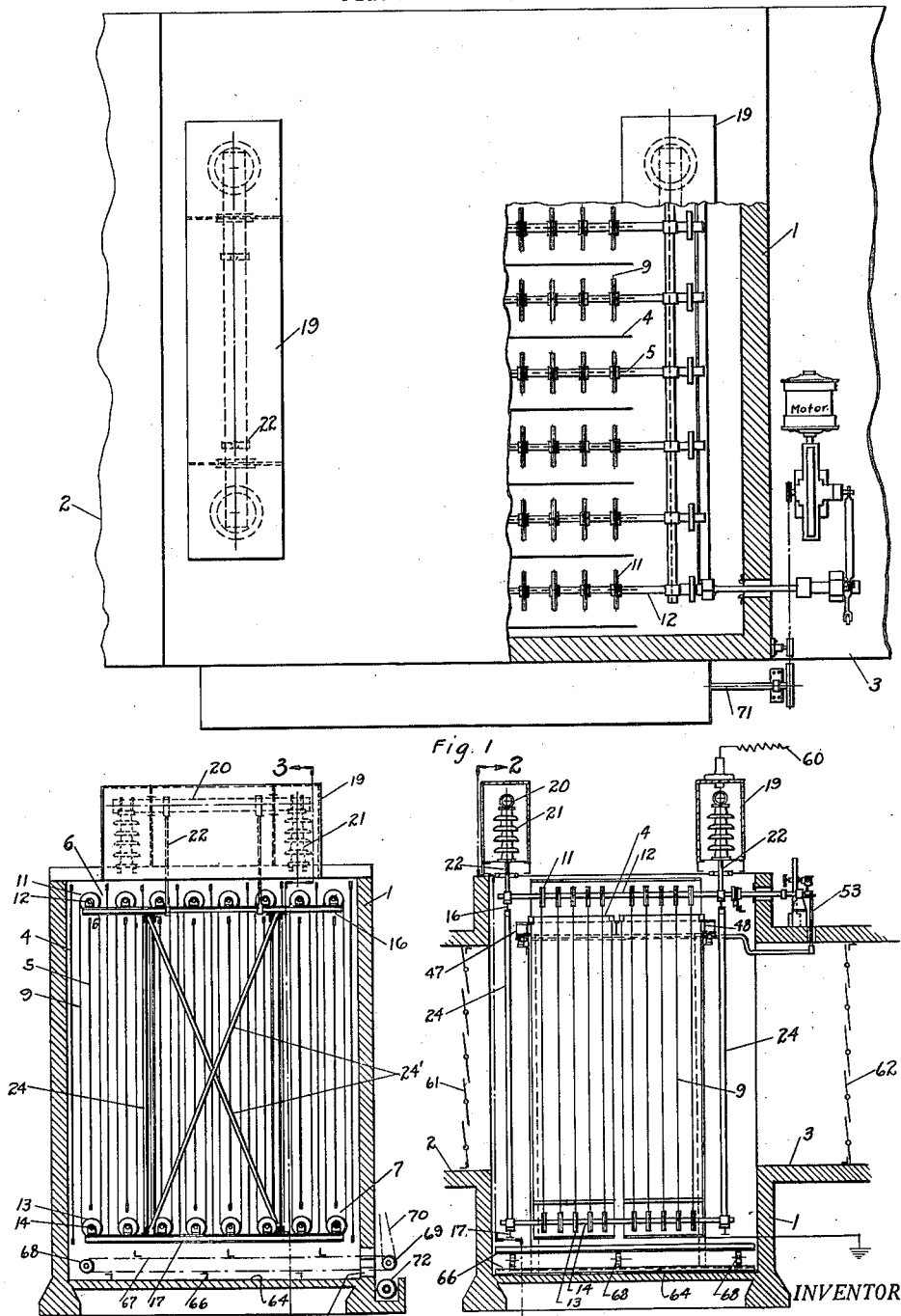

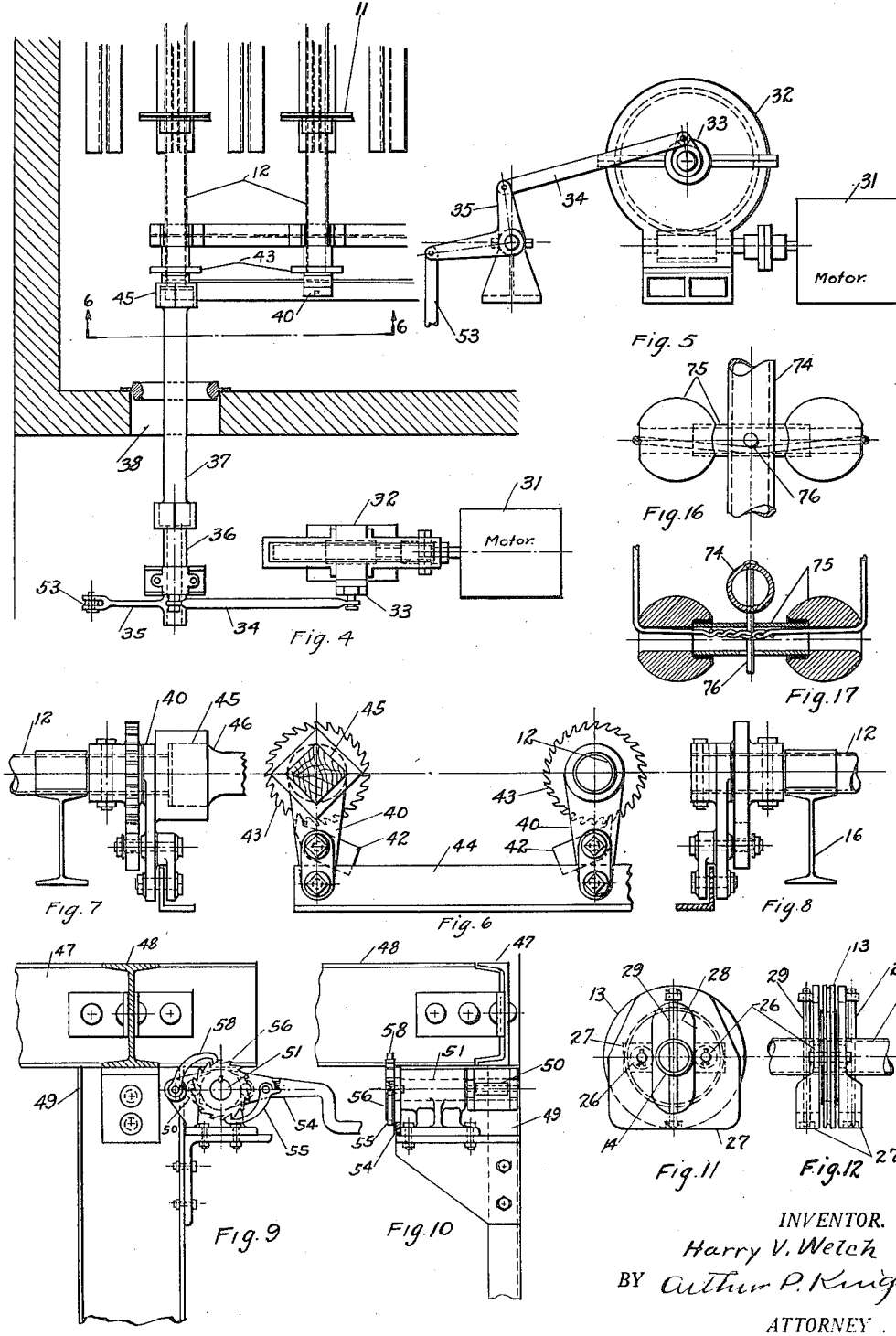

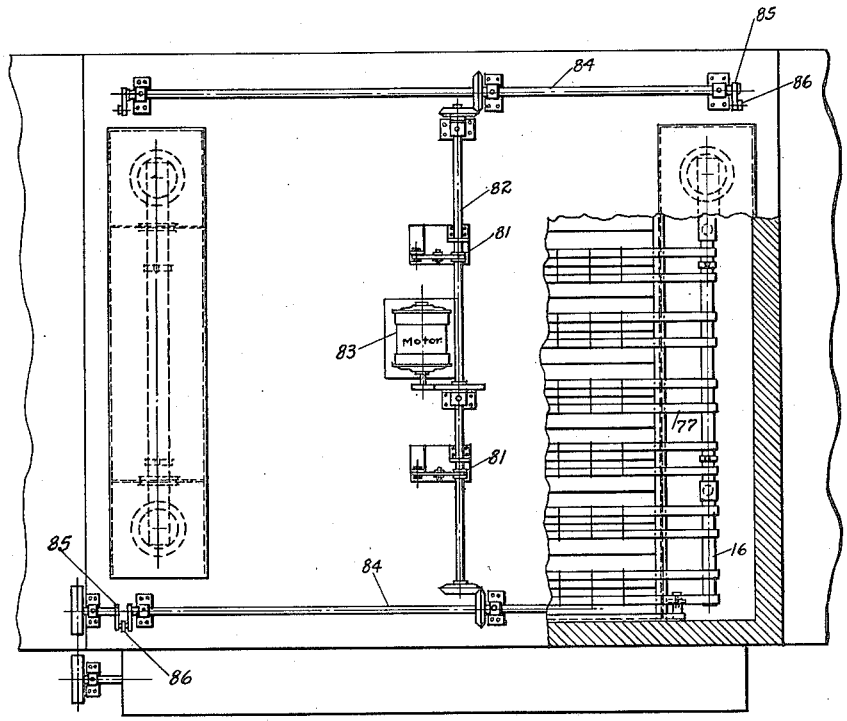
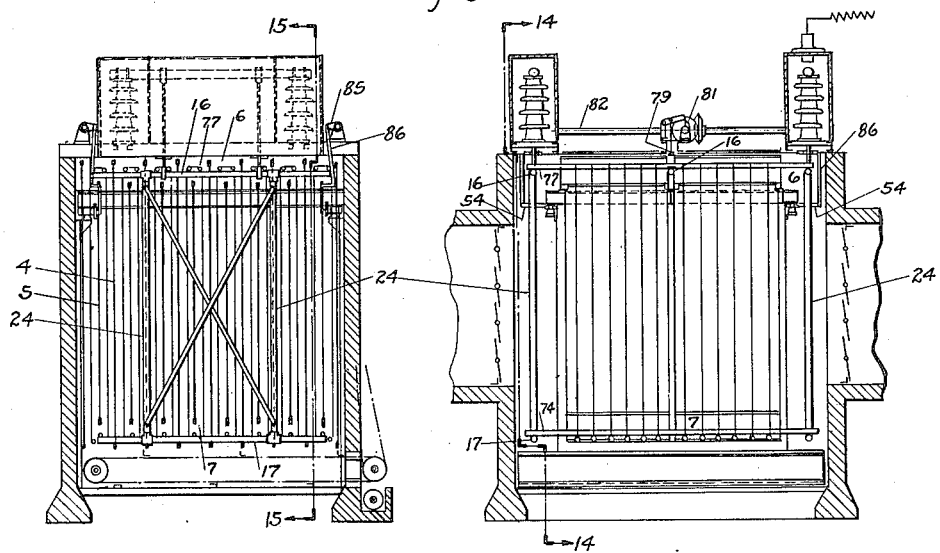

1,481,970

UNITED STATES PATENT OFFICE.

HARRY V. WELCH, OF LOS ANGELES, CALIFORNIA, ASSIGNOR TO INTERNATIONAL PRE-CIPITATION COMPANY, OF LOS ANGELES, CALIFORNIA, A CORPORATION OF CALIFORNIA.

APPARATUS FOR ELECTRICAL PRECIPITATION OF SUSPENDED PARTICLES FROM GASES.

Application filed February 26, 1921. Serial No. 448,070.

*To all whom it may concern:*

Be it known that I, HARRY V. WELCH, a citizen of the United States, residing at Los Angeles, in the county of Los Angeles and State of California, have invented a new and useful Apparatus for Electrical Precipitation of Suspended Particles from Gases, of which the following is a specification.

This invention relates to the art of electrical separation of suspended particles from gases by electrical action, and the main object of the invention is to provide an apparatus for effecting such separation which will have maximum capacity or effectiveness for a given size and cost of the apparatus.

A further object of the invention is to provide improved means for supporting the high tension electrode system in such an apparatus.

Another object of the invention is to provide improved means for removing from the electrodes material deposited thereon in the operation of the apparatus.

The accompanying drawings illustrate embodiments of my invention, and referring thereto:

Fig. 1 is a partly broken plan view of an electrical precipitator embodying my invention;

Fig. 2 is a vertical section on line 2—2 in Fig. 3;

Fig. 3 is a vertical section on line 3—3 in Fig. 2;

Fig. 4 is a plan view of part of the mechanism for operating the electrodes to clean the same, part of the enclosing casing being shown in section;

Fig. 5 is an end elevation of the motive devices for said electrode operating means;

Fig. 6 is a section on line 6—6 in Fig. 4;

Fig. 7 is a side view at the left hand of Fig. 6;

Fig. 8 is a side view at the right hand of Fig. 6;

Fig. 9 is an end elevation; and

Fig. 10 is a side elevation of the jarring means for the collecting electrodes;

Fig. 11 is a detail end elevation of and Fig. 12 is a side elevation of a stretching or tensioning means for the high tension electrode devices;

Fig. 13 is a plan view partly broken away of another form of the invention, in which the discharge electrodes are stationary;

Fig. 14 is a section on line 14—14 in Fig. 15;

Fig. 15 is a section on line 15—15 in Fig. 14;

Fig. 16 is a plan view, and Fig. 17 is a vertical section of the lower mounting for the discharge electrodes shown in Figs. 13 to 15.

The apparatus shown in Figs. 1 to 3 comprises a flue casing or chamber 1 through which the gases pass horizontally from an inlet 2 to an outlet 3, this flue being, for example, a flue leading from a furnace to an outlet stack and conducting the dusty or fume-bearing gases passing from such furnace to said stack. A series or plurality of collecting electrodes are mounted in such flue, said collecting electrodes consisting of vertical plates, screens or other substantially plane members, extending parallel to the direction of the flow of gases through the flue 1. The said collecting electrodes comprise relatively long plates 4 and relatively short plates 5 alternating with the long plates in such manner as to leave free spaces 6 and 7 above and below the short plates for the purpose hereinafter set forth. The long plates preferably extend substantially the full height of the chamber in which precipitation is effected, so as to utilize the full cross-sectional area of the flue as effective precipitation space.

The discharge electrodes 9 consist of flexible conductors, such as wires or chains, rotatable carrying or supported on supporting means which are mounted in the open spaces 6 and 7 aforesaid. In the form of the invention shown in Figs. 1 to 3 these rotatable carrying or supporting means comprise pulleys or wheels 11 mounted on shafts 12 extending in the upper spaces 6 and supporting means 13 mounted on shafts 14 extending in the lower spaces 7, said shafts 12 and 14 being, respectively, mounted on upper and lower frame bars 16 and 17, which are supported in any suitable manner so as to be insulated from the collecting electrodes. A suitable form of mounting consists, as shown in the drawing, of beams 20 carried by insulators 21, in insulator boxes 19 above the chamber 1, and suspension rods 22 suspended from said beams and connected to the upper frame bars 16 to support the same, the lower frame bars 17 being suspended by vertical bars 24 from the upper frame bars. By means of diagonal frame bars 24', as shown in Fig. 2, a rigid frame is provided for the high tension system. The discharge electrodes 9 are preferably formed as endless flexible members, such as wires or chains, mounted on pulleys 11 and 13 aforesaid in such manner that one vertical run of each endless flexible member 9 extends between a short electrode plate 5 and an opposing long electrode plate 4, and the other vertical run of said flexible electrode member 9 extends between the same short electrode plate 5 and another long collecting electrode plate 4, the centers of the upper and lower supporting pulleys 11 and 13 being in the same plane as the said short electrode plate 5.

It is desirable to provide a tensioning means for the flexible discharge electrode members 9 and for this purpose the bearing for the lower pulleys 13 on the lower shaft 14 is preferably made as shown in Figs. 11 and 12, so as to provide for vertical movement, said pulleys being, for example, mounted to turn on rollers 26 engaging with an internal annular bearing on the said wheel 13, said rollers being carried by bearing members 27, which also serve as tensioning weights. Said bearing members have vertical slots 28 through which the shaft 14 passes and vertical guide bolts 29 are provided on the said bearing members, said bolts passing vertically through openings in the shaft 14 to guide the bearing members and the pulley 13 in their vertical movement on the shaft 14, while holding the pulleys from endwise or sidewise displacement.

I prefer to provide means for moving the discharge electrodes so as to cause them to travel over the pulleys 11 and 13 and thereby cause any material which has collected on same to fall off of the electrodes by reason of the bending action on the electrodes in passing over said pulleys; for this purpose the respective carrying shafts 12 may be operated continuously or intermittently by any suitable driving means. For example, as shown in the drawings, a driving motor 31 may operate through suitable gearing, indicated at 32, a crank 33, which through a link 34 and lever 35 operates a rock shaft 36, said rock shaft being connected by a shaft 37 of wood, or other suitable insulating material, to operating means for one of the shafts 12 aforesaid. It is desirable to mount the said motor outside of the precipitator casing, the connecting shaft 37 extending through an opening 38 in the wall of the precipitator. An operating arm 40 is provided on each of the shafts 12, said arms being loosely mounted on the shaft and connected to operate the corresponding shaft by means of a pawl 42 on the arm engaging the ratchet wheel 43 on the shaft, said arms being connected to operate in unison by a bar 44 pivoted to each of the arms. One of said arms 40 has a square socket 45 to receive the square end portion 46 of the connecting shaft 37.

The collecting electrode system may also be movably mounted, the electrode plates 4 and 5 being carried by cross beams 48 connected by horizontal beams 47 which normally rest on supporting posts 49 and are lifted from time to time by cams 50 engaging with said horizontal beams. Said cams may be carried by a shaft 51 operated by the motor 31 aforesaid, for example, by a connection 53 from the lever 35 to a pawl lever 54 carrying a pawl 55 engaging a ratchet wheel 56 on the cam shaft 51. A pawl 58 engages ratchet wheel 56 to hold the same from backward rotation, but permits the ratchet wheel to turn freely forward when one of the lifting cams 50 has passed beam 47 to maximum height and has passed the dead center, the weight of the beam and the parts carried thereby then driving the cam suddenly forward and allowing the collecting electrode system to drop suddenly onto the supports 49, giving a jarring action.

The low tension system is grounded through metallic connection of the metal parts, and the high tension system is connected by wire 60 to any suitable high tension circuit, preferably supplying unidirectional or rectified current.

Suitable damper means 61 and 62 may be provided in the inlet and outlet means 2 and 3 for the gases. Any suitable means may be provided for removing from the lower part of the precipitator chamber the material falling thereinto from the electrodes. To reduce to a minimum the waste space generally existing at the bottom of the precipitator, I prefer to provide the precipitator chamber with a flat floor 64 leaving only sufficient space between such floor and the bottom of the high tension electrode frame to provide room for operation of a travelling scraper means without liability of causing short circuit in the apparatus. Such scraper means may consist of flights or scraper bars 66 carried by endless chains 67 mounted on wheels 68 and 69, the wheels 69 being driven by connection of a driving chain 70 to the shaft 71 of said wheels. These scraper bars drag the collected material along the floor of the precipitator casing and push it through an outlet 73 to a conveyor 72 in which it is conveyed to any desired receiving means.

The construction of the collecting electrodes above described may be used with other forms of discharge electrodes. For example, as shown in Figs. 13 and 15, in which the construction is the same as above described except as hereinafter set forth, the discharge electrode wires or chains may be passed over fixed rods or bars 74 and 77 mounted in the spaces 6 and 7 aforesaid to retain the said electrodes in position between the short collecting electrodes 5 and the long collecting electrodes 4. Said bars 74 and 77 may be mounted on a high tension frame consisting of frame bars 16, 17 and 24 supported and insulated as above described. The mounting of the electrodes on the lower bars may, as shown in Figs. 16 and 17, provide for tensioning, said electrodes passing through tubular weighted members 75, which are guided vertically on pins 76 on bars 74. In this case the discharge electrodes may be cleaned by jarring the same by drop bar 79, (Fig. 15), striking bars 77 and lifted by cams 81 on a shaft 82, which is geared for operation by a motor 83. Said shaft 82 may also be geared to shafts 84 which carry levers 85 for operating rods 86 which are connected to the operating levers 54 of the ratchet devices shown in Figs. 9 and 10 for operating the lifting cams 50 for the collecting electrode system.

What I claim is:

1. An electrical precipitator comprising a flue adapted for passage of the gases horizontally therethrough, a plurality of relatively long collecting electrodes extending vertically in said flue parallel to the direction of gas flow therein and extending nearly to the top and bottom of the flue, a plurality of relatively short collecting electrodes extending in said flue in alternate arrangement with said relatively long electrodes, so as to leave free space above and below said relatively short electrodes, insulated electrode supporting means extending in said flue spaces and high tension discharge electrodes mounted on said supporting means and extending vertically between opposing long and short collecting electrodes.

2. A construction, as set forth in claim 1, in which said electrode supporting means comprises pulleys, and the discharge electrodes are formed as endless flexible members mounted on said pulleys.

3. A precipitator, as set forth in claim 2, and comprising, in addition, means for operating said pulleys to cause the discharge electrodes to travel thereon and to be bent in passing around the pulleys, so as to cause collected material to be removed therefrom by such bending.

4. In an electrical precipitator discharge electrode means, comprising shafts, pulley means carried by said shafts, endless flexible conducting members mounted on said pulley means, and means for revolving said pulley means.

5. In an electrical precipitator the combination with parallel collecting electrodes of discharge electrodes extending between said collecting electrodes and consisting of endless flexible members, rotatable carrying means for supporting said endless flexible members and means for revolving the said carrying means.

6. In an electrical precipitator a discharge electrode system consisting of a plurality of endless flexible members of small cross section, rotatable carrying means on which said endless flexible conducting members are mounted and means for rotating said rotatable carrying means to cause bending of the discharge electrode for the purpose of effecting removal of deposited material therefrom.

7. In an electric precipitator, the combination of collecting electrodes and discharge electrodes movably mounted independently of each other and separate means for moving the two sets of electrodes.

8. In an electric precipitator, the combination of collecting electrodes and discharge electrodes movably mounted independently of each other, separate means for moving the two sets of electrodes and a single motor operatively connected to the said separate moving means for actuating them.

9. In an electric precipitator, the combination of a plurality of collecting electrode plates, a supporting frame therefor mounted for reciprocating movement in the direction of the length of the plates, discharge electrodes having portions extending between the plates and intermediate portions passing around the plates, pivotal supports for the intermediate portions, means for moving the discharge electrodes over said pivotal supports and means for imparting reciprocating motion to the frame carrying the collecting electrodes.

10. In an electric precipitator, a discharge electrode comprising a flexible conducting member disposed to form a plurality of bights and a plurality of straight lengths in parallel relation, revoluble means in the bights for moving the flexible member in the direction of its length and means for imparting motion to said revoluble means.

In testimony whereof I have hereunto subscribed my name this 3rd day of February, 1921.

HARRY V. WELCH.